Figures 1, 2:
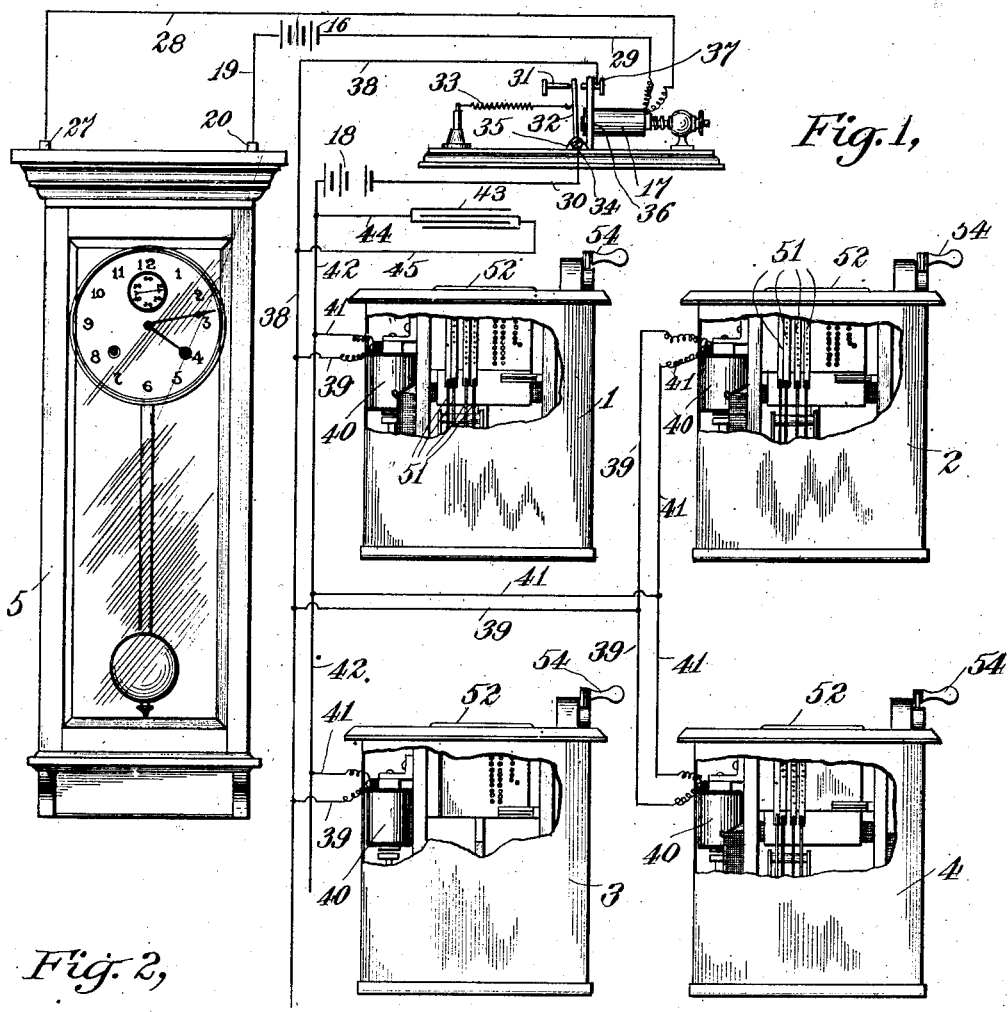

J. W. BRYCE.
TIME RECORDER.
APPLICATION FILED SEPT. 21, 1908.

1,075,543.

Patented Oct. 14, 1913.
10 SHEETS—SHEET 1.

WITNESSES:

INVENTOR
James W. Bryce
BY
Kenyon & Kenyon
ATTORNEYS

J. W. BRYCE.
TIME RECORDER.
APPLICATION FILED SEPT. 21, 1908.

1,075,543.

Patented Oct. 14, 1913.
10 SHEETS—SHEET 5.

J. W. BRYCE.
TIME RECORDER.
APPLICATION FILED SEPT. 21, 1908.
1,075,543.
Patented Oct. 14, 1913.
10 SHEETS—SHEET 6.
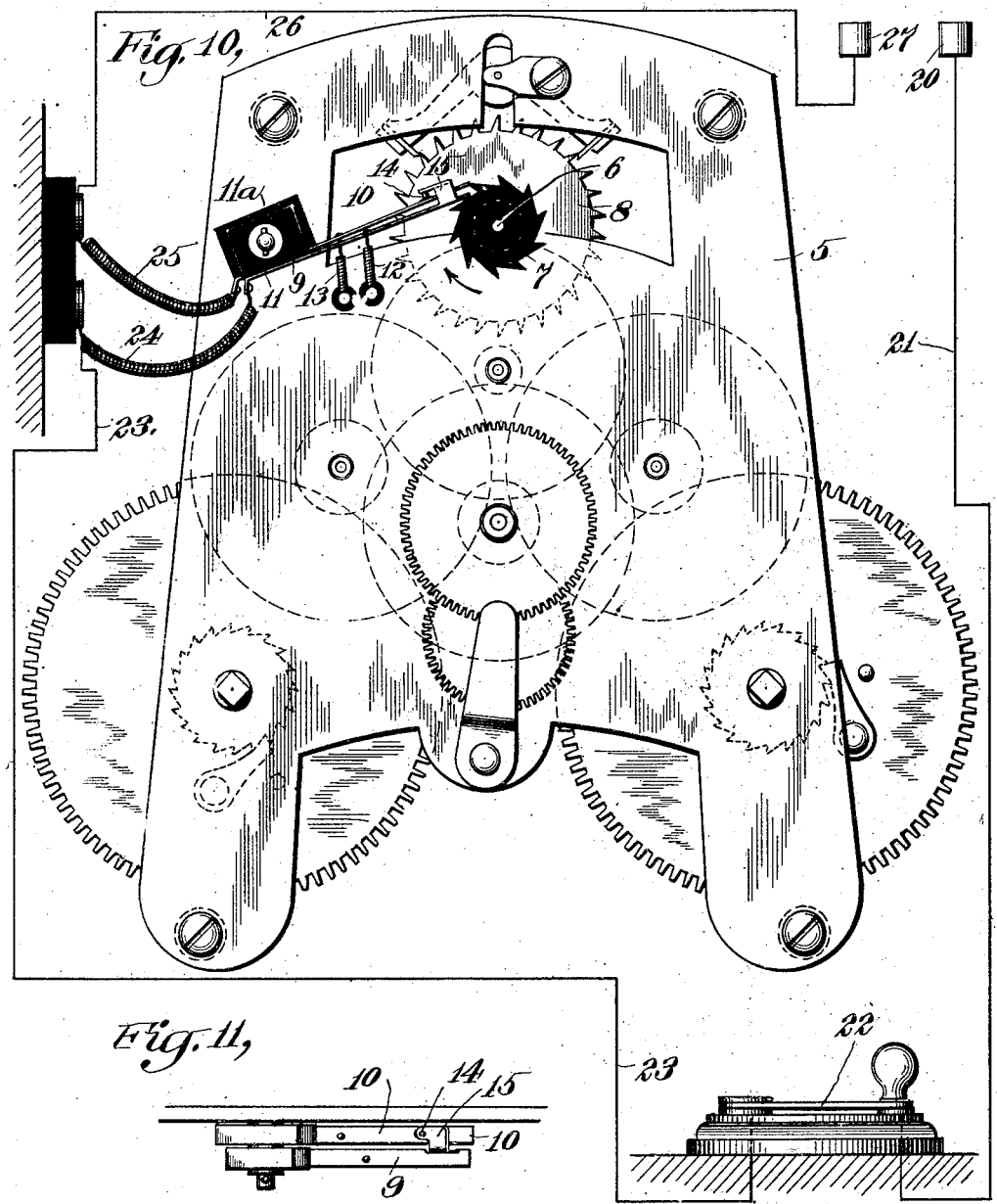
WITNESSES:
INVENTOR
James W. Bryce
BY
Kenyon & Kenyon
ATTORNEYS

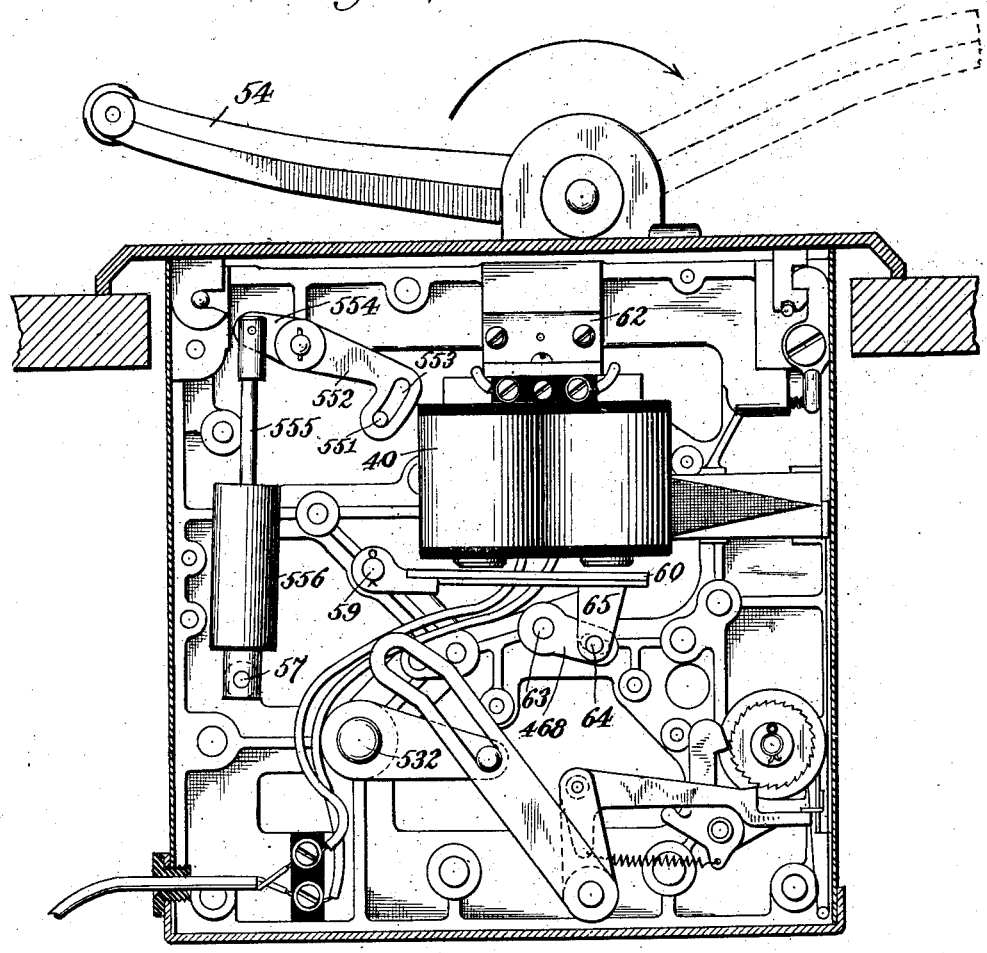

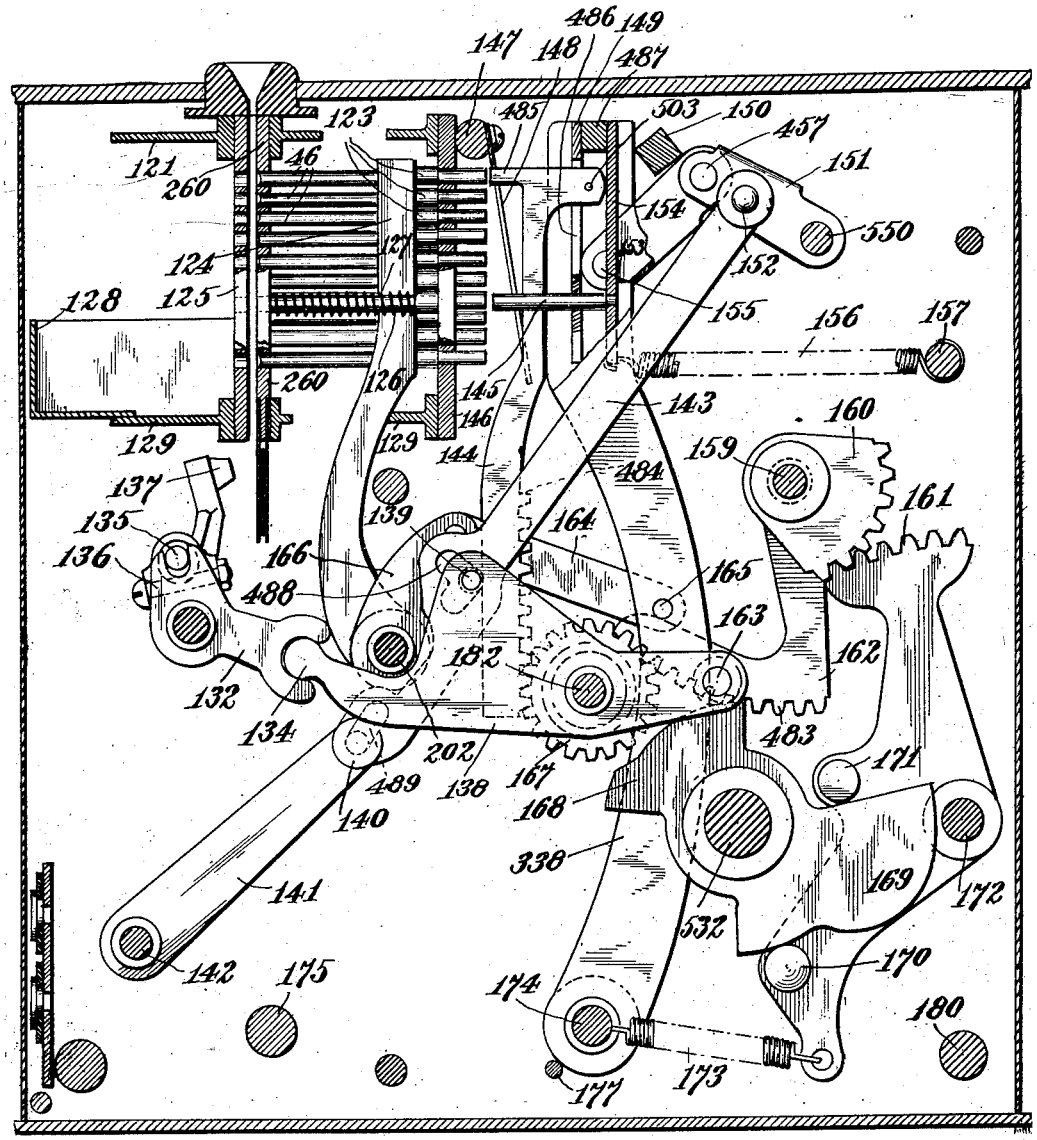

J. W. BRYCE.
TIME RECORDER.
APPLICATION FILED SEPT. 21, 1908.

1,075,543. Patented Oct. 14, 1913.
10 SHEETS—SHEET 9.

J. W. BRYCE.
TIME RECORDER.
APPLICATION FILED SEPT. 21, 1908.

1,075,543.

Patented Oct. 14, 1913.
10 SHEETS—SHEET 10.

WITNESSES:

INVENTOR
James W. Bryce
BY
Kenyon & Kenyon
ATTORNEYS

UNITED STATES PATENT OFFICE.

JAMES W. BRYCE, OF BROOKLYN, NEW YORK.

TIME-RECORDER.

1,075,543.

Specification of Letters Patent.

Patented Oct. 14, 1913.

Application filed September 21, 1908. Serial No. 454,130.

*To all whom it may concern:*

Be it known that I, JAMES W. BRYCE, a citizen of the United States, and a resident of Brooklyn, in the county of Kings and State of New York, have invented certain new and useful Improvements in Time-Recorders, of which the following is a specification.

My invention relates to time recorders. It is of an especial value in elapsed time recorders, although it is not necessarily limited to machines recording elapsed time.

It has for its object to provide a system of time recorders containing a plurality of recording machines adapted to be operated in exact synchronism with each other and preferably in coöperation or interchangeably, so that, if desired, part of a time record, as for example part of an elapsed time record, may be made on one machine of the system and be completed on another and yet both or all of the machines be operated in exact synchronism with one another.

It consists of the novel features and combinations herein shown and described.

In the accompanying drawings forming part of this specification I have shown my invention in its preferred form and I will now proceed to describe such preferred form as disclosed in the drawings.

Figure 3:
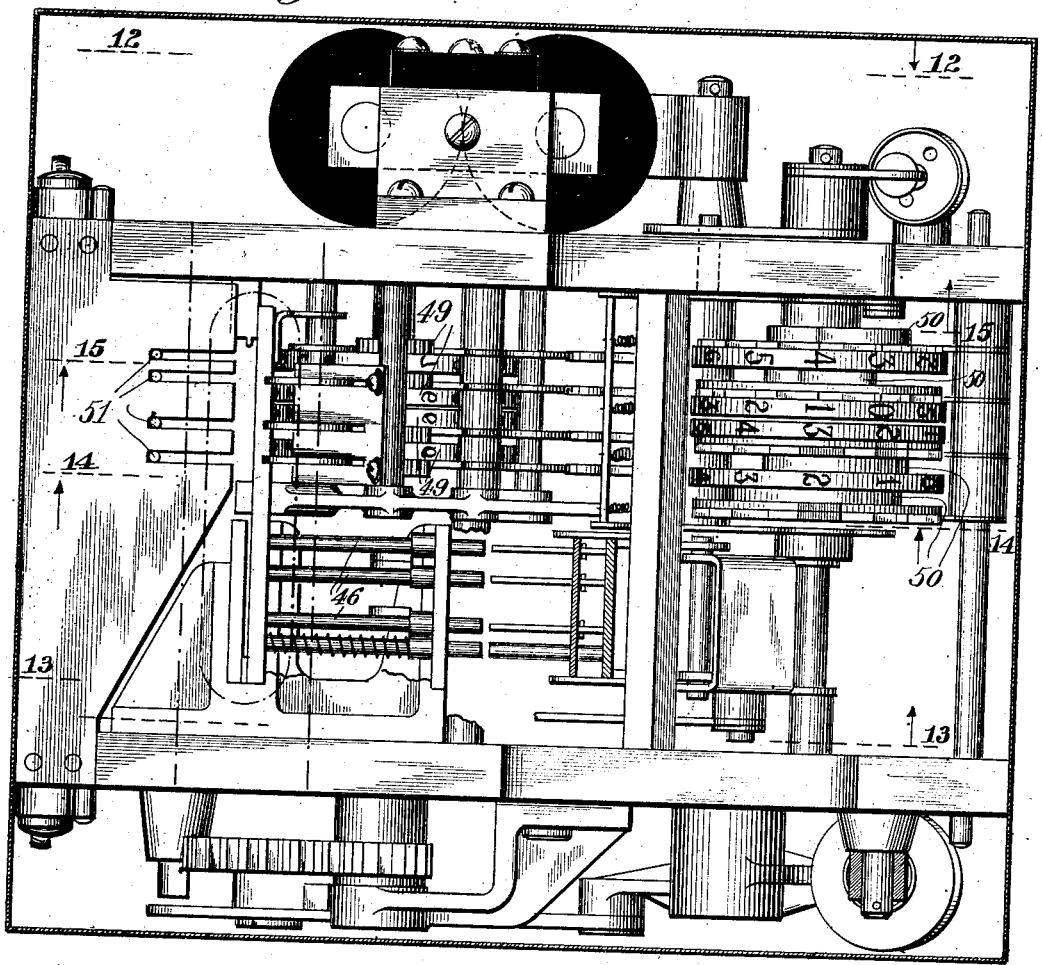
Figure 4:
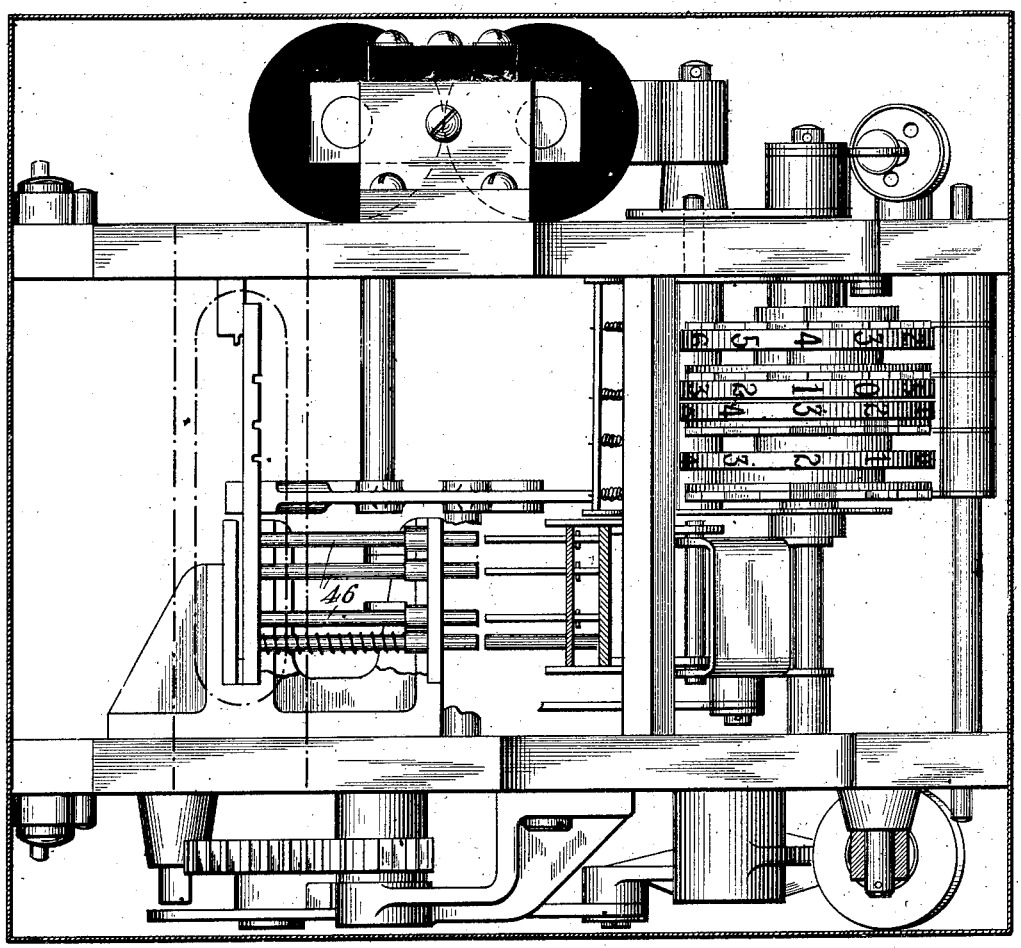
Figure 5:
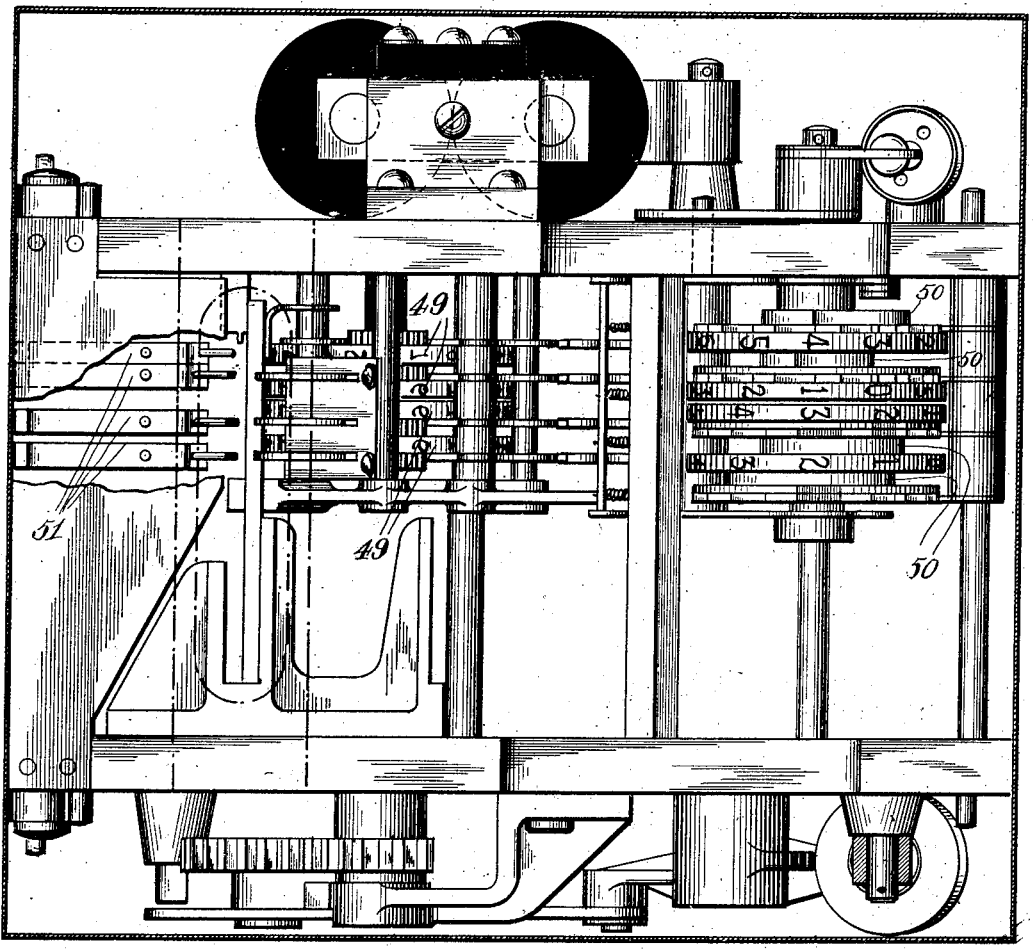
Figure 6:
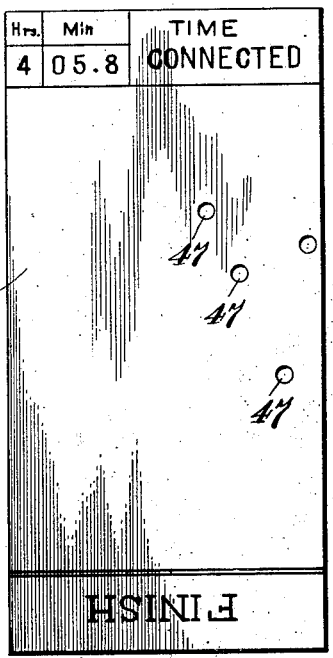
Figure 7:
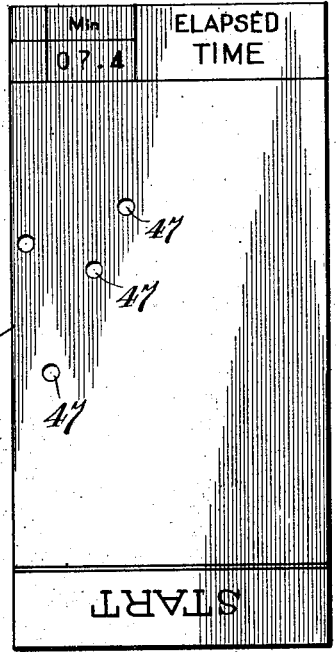
Figure 14:
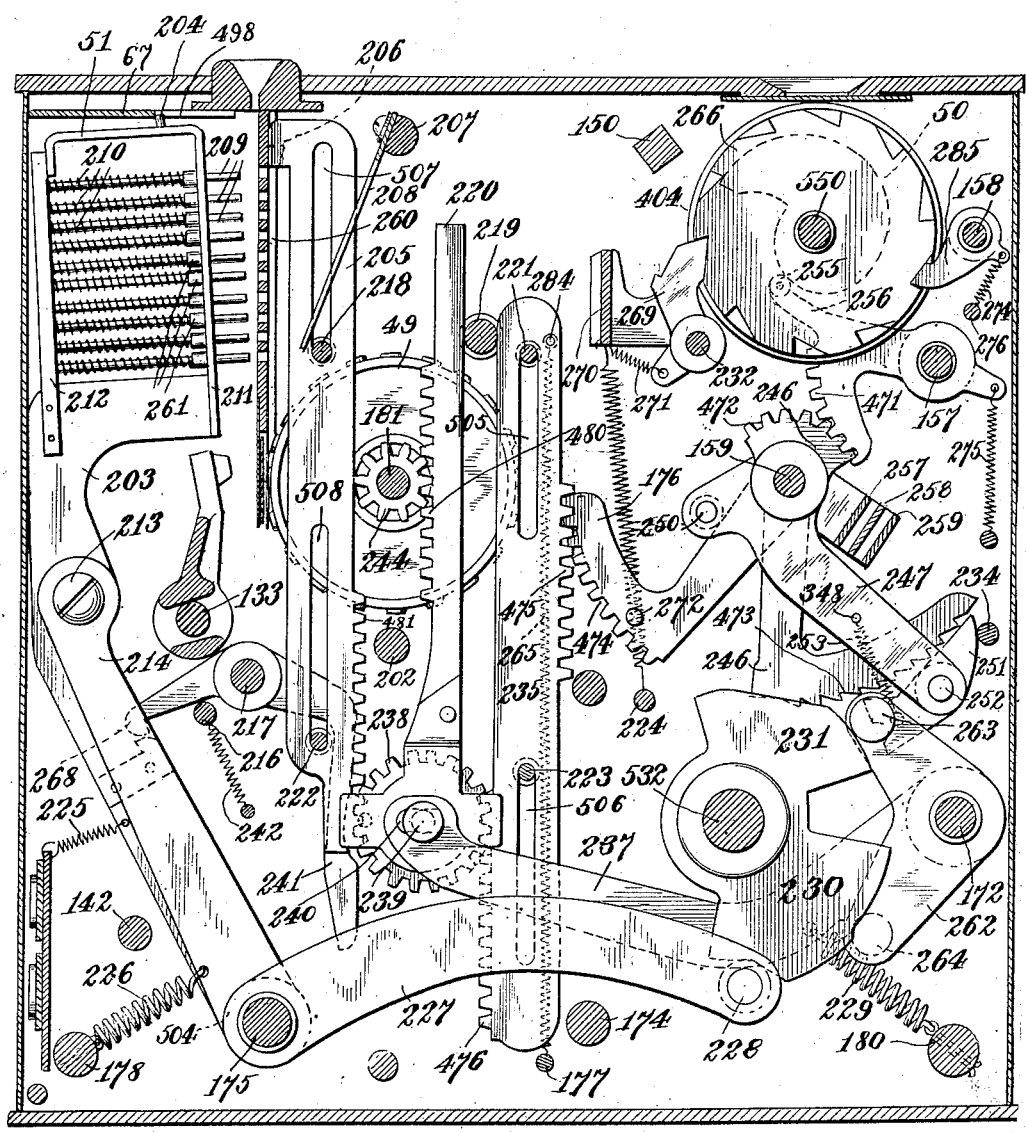
Figure 15:
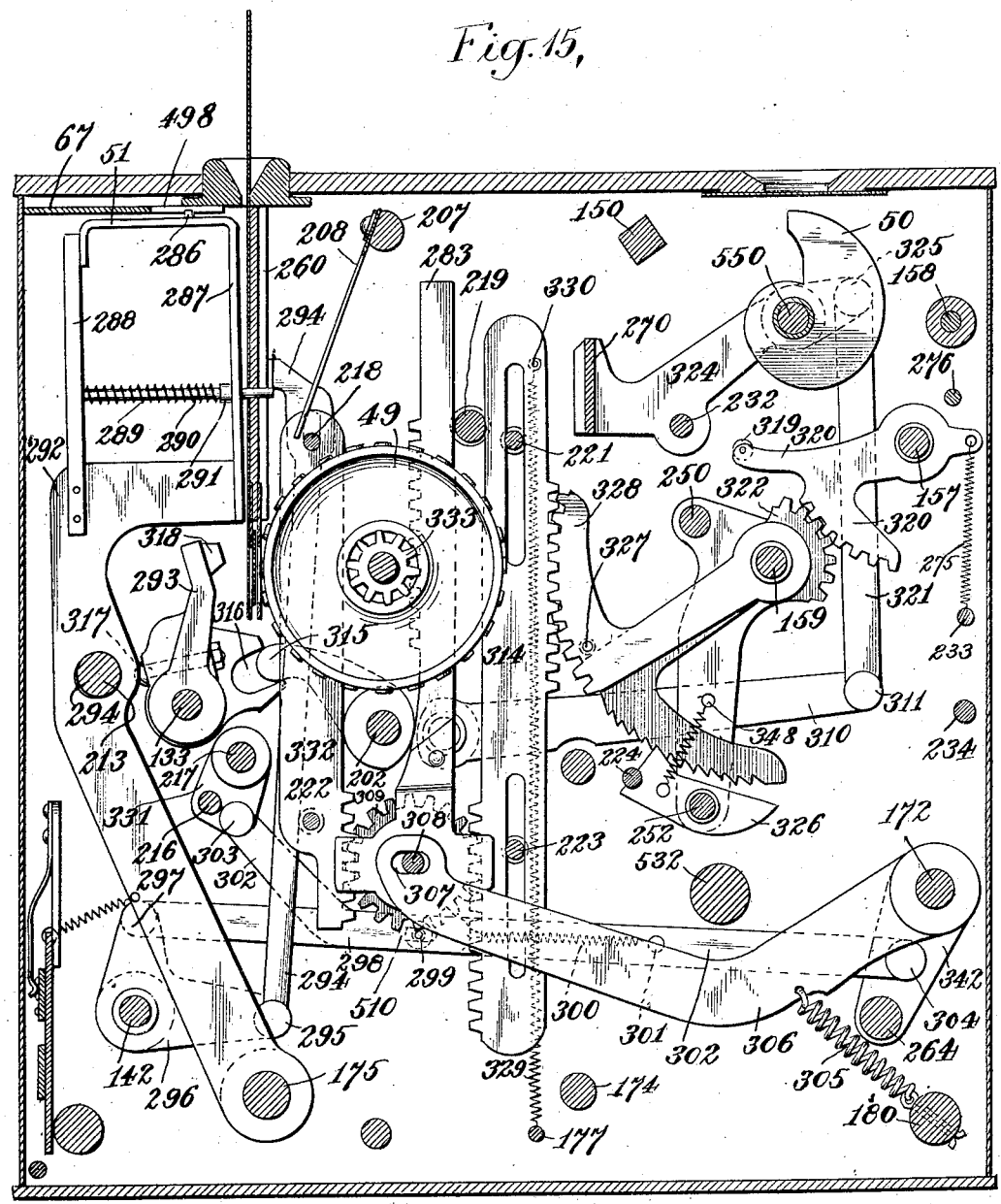

Referring to the drawings Figure 1 is a diagrammatic sketch of a system embodying my invention; Fig. 2 is a similar view of a modification in which the recording machines are arranged in series, instead of in multiple as in Fig. 1, the master clock being omitted; Fig. 3 is a plan view of the interior of one form of elapsed time recording machines adapted for use in my invention, the machine being somewhat diagrammatically represented and with many of the minor details omitted; Fig. 4 is a similar view of another form of elapsed time recording machine adapted to be used in my invention and Fig. 5 is a similar view of still another machine thus adapted; Figs. 6, 7, 8 and 9 are views of a record card adapted to be used in such machines, Figs. 6 and 7 representing one form of card and Figs. 8 and 9 a modification thereof; Fig. 10 is an elevation of cert. in parts of the mechanism of the master clock and Fig. 11 is a plan view of the make and break contact springs of the clock mechanism; Fig. 12 is a vertical rear section taken just inside of the case on the lines 12—12 of Fig. 3. Fig. 13 is a vertical section on the lines 13—13 of Fig. 3, showing the punching mechanism. Fig. 14 is a vertical section on the lines 14—14 of Fig. 3, illustrating the operation of the elapsed time type wheels, differentials, pin boxes and connecting parts. Fig. 15 is a vertical section on the lines 15—15 of Fig. 3.

In my invention I employ a plurality of time indicating or recording devices, preferably elapsed time recording machines, each provided with suitable time indicating or recording devices, and all synchronously controlled by a master clock so that the time indicating or recording devices of all the different machines of the system will be operated in exact synchronism with each other. Any suitable time indicating or recording machines may be employed, but in the drawings I have shown elapsed time recording machines 1, 2, 3 and 4. 5 is the master clock which synchronously controls them all. Any suitable means may be employed between the clock mechanism and the devices of the different machines. I prefer to employ electrical means for this purpose and the specific means shown I will now describe.

The clock mechanism is of the usual kind and the details thereof accordingly will not be described.

7 is a ratchet-wheel fast on a shaft 6 connected with wheel 8 driven by the main springs in the usual manner. Ratchet-wheel 7 is provided with ten teeth and is so connected with the mechanism as to make a complete revolution every minute, the teeth therefore measuring time in tenths of a minute.

9 and 10 are two make and break contact springs mounted on two blocks of insulation 11 and 11ª and are normally pulled downward by springs 12 and 13 respectively. The outer or free ends of the contact springs rest upon the teeth of ratchet-wheel 7.

14 is a contact pin projecting downwardly from a bracket 15, which bracket is secured to the side of spring 9 and which rises up and stretches over the top of spring 10. Pin 14 is adapted to make contact with spring 10 when the parts are as shown in Fig. 10, with the free end of spring 9 on one tooth of ratchet-wheel 7 and the outer end of spring 10 on the next upper tooth. In this position of the parts electrical contact is maintained between springs 9 and 10. In the further rotation of ratchet-wheel 7 in the direction of the arrow, Fig. 10, this electrical contact is broken when spring 10 falls from the upper tooth and the two springs 9 and 10 rest upon the same tooth. When spring 10 drops off the tooth, this contact is broken. Electrical contact between spings 9 and 10 is accordingly made and broken every tenth of a minute. This is used to synchronously control the different machines by means of a primary circuit of which springs 9 and 10 form a part and of which 16 is the battery and 17 a relay, and by means of a secondary circuit of which 18 is the battery. It will, of course, be understood that any other suitable electrical arrangement of circuit or equivalent devices may be employed for this purpose. The full circuit of the primary circuit is from battery 16 (Fig. 1) through wire 19 to binding-post 20, wire 21 (Fig. 10), switch 22, wire 23, wire 24, contact spring 9, bracket 15, contact pin 14, spring 10, wire 25, 26, binding-post 27, wire 28 (Fig. 1) to relay 17, wire 29 back to battery. The secondary circuit is from battery 18, through wire 30, pivot 34 of armature lever 32, armature lever 32 (adapted to be retracted by spring 33, and pivoted at 34 to a metallic support 35), screw 37 mounted in supporting bracket 36, through which it projects, thence by wires 38 and 39 to a magnet 40 in each elapsed time recording machine, wires 41 connecting each magnet to return wire 42 of the circuit.

The operation of the connecting circuits will, of course, be readily understood. Wherever the primary circuit is closed relay 17 will make the secondary circuit by pulling armature 32 of relay 17 against contact screw 37. Whenever the primary circuit is broken the secondary circuit will be broken. Thus every tenth of a minute each magnet 40 in each recording machine will be energized and deënergized. These various magnets operate the devices which control the time recording or indicating operation of each machine and as these magnets are all energized and deënergized in absolute synchronism with each other, the time indicating or recording devices of all of the machines are operated in exact synchronism with each other.

43 is a condenser connected with the secondary circuit by means of wires 44 and 45 to prevent sparking in the usual manner.

The magnets 40 control the time indicating or recording mechanism of the different machines and may do this in any suitable manner. The devices shown for the purpose will be described later on.

Of course, any suitable indicating or recording mechanism may be used. In the accompanying drawings I have illustrated such recording mechanism simply diagrammatically without attempting to give all of its details. I have shown enough details, however, to illustrate the operation of such mechanism and will describe them farther on in this specification. For example, machines 1 and 2, illustrated in Figs. 1 and 3, are elapsed time recording machines similar in construction and are both provided with two kinds of time recording devices, viz: punches 46 adapted in the first operation of the machine to punch holes 47, such as are shown in Figs. 6 and 7 in card 48, indicating by their relative location on the card the minute and tenths of a minute of the time of such first operation; and secondly, printing time type wheels 49, which are controlled through the magnet 40 and timing cams 50, 50, and suitable operating mechanism, to print upon a suitable record surface, such as for example the card 48, the time of such first operation (in the card shown in Fig. 6 this printing is given as four o'clock and five minutes and eight tenths of a minute), and which time type wheels, in a second operation (when the card 48, previously punched with holes 47, is again inserted into the machine) are controlled through magnet 40 and timing cams 50 and through suitable devices controlled by the relative location of such holes in the card, as for example, pin boxes 51, 51, to print the time that has elapsed between the two operations. In my previous application for an improvement in time recorders, Serial Number 436,444, filed June 3, 1908, I have shown and described in full detail a machine like machines 1 and 2 of Fig. 1. I will, therefore, farther on in this specification describe only such details of these machines as are necessary to illustrate the general operation of these machines. The card 48 used in such machines, illustrated in Figs. 6 and 7, is adapted on the first operation to be inserted with the word "Start" facing the operator, as it is inserted in the card chute 52, with the word "Start" at the top and in the second operation, when the card is inserted for a second time in the chute 52, it is inserted with the other side of the card facing the operator, namely, the side with the word "Finish" on it, and with that word at the top. In the first operation the time of the first operation is printed by the time type wheels 49, 49 and as shown on the card of Fig. 6 this is 4 hours and 05.8 minutes. In the second operation the elapsed time is printed by the same type wheels 49, 49, upon one end of the card, opposite the words "Elapsed time." As shown in Fig. 7, this is given as 07.4 minutes, showing that the elapsed time between the two operations is seven minutes and four tenths of a minute.

Figure 8:
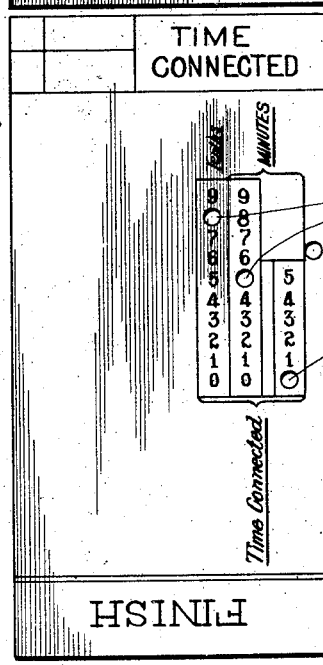
Figure 9:
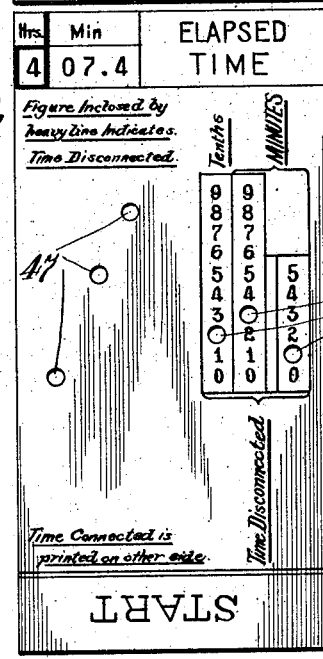

Figs. 8 and 9 illustrate a modification or other form of card adapted to be used with such a machine as is illustrated in machines 1 and 2 of Figs. 1 and 3, the card here having first printed on it a scale representing tens and units and tenths of minutes, the location of the punched holes 47, 47, indicating at a glance by their location on the scale the time in minutes and tenths of a minute, and the holes 53, 53 in the card, as shown in Fig. 9, indicating the time of disconnection or the second operation. In my previous application I have shown and described the punching mechanism 46, 46, either as operated only at each first operation of the machine and not at its second operation, giving records on the cards such as are illustrated in Figs. 6 and 7, or as operated at both the first and the second operation, giving a record such as the punch holes 53, 53 of Fig. 9, which holes indicate, by their relative position on the card, the time of the second operation.

Machine 3 illustrated in Figs. 1 and 4 is a somewhat different recording machine from machines 1 and 2. In machine 3 the time recording devices consist simply of the punches 46, 46, 46, controlled as in machines 1 and 2, and giving only the indication of the time of the first operation and giving this simply by the location of punched holes 47, 47, in the card, as illustrated in Figs. 6 and 8.

Machine 4, illustrated in Fig. 1 and Fig. 5, has no punching devices, but is provided simply with time recording devices consisting of the time type wheels 49, 49, similar to those of machines 1 and 2 and similarly controlled. This machine is adapted to print the elapsed time upon cards that had been previously punched by machines like machine 3.

In the operation of such machines as machines 3 and 4 the operator at the beginning of a job or at the beginning of a telephone connection inserts a suitable card, similar to that of Figs. 6 and 8 or any other suitable card, into the card slot 52 of machine 3 and operates the handle 54 and a record is produced on the card of the holes 47, 47, indicating the time when such operation takes place. At the conclusion of the job or telephone connection, he inserts the same card with the face reversed in the card slot 52 of machine 4 and operates the handle 54. This causes the type wheels 49 to print the elapsed time between the first and second operations. The two machines thus coöperate together to make a complete time record, as shown a record of elapsed time. Coöperation may also exist between machine 3 or 4 and machine 1 or 2. In my improved system coöperation between the machines is made feasible because the machines are at all times in exact synchronism with each other. Similarly any of the machines, such as machines 1 and 2, may coöperate with each other, for example a card can at the first operation be inserted into one machine and the same card, previously punched in that operation may be inserted into the other machines for the completion of the elapsed time recording operation, as the machines are always in exact synchronism with each other or the machines may be used interchangeably, as desired.

In Fig. 1 the machines are shown as electrically connected in multiple. In Fig. 2 I have illustrated the machines 1, 2, 3 and 4 as connected electrically in series. In this case the circuit wires 38 and 42 pass through the machines in series as shown. 55 are resistances adapted through switches 56, 56, to be thrown in the circuit whenever one of the machines is disconnected or thrown out of operation. This is done to furnish a by-path for the current and each resistance 55 is preferably proportioned to the resistance of its corresponding machine to maintain the same aggregate resistance for the entire circuit whether the machine is in or out of operation.

By means of my improvement a plurality of time recording machines may be employed in coöperation or interchangeably, and all the machines of the system will make time records in accurate and exact synchronism with all of the other machines of the system, and this whether the machines are side by side or separated from one another or in different localities. It permits part of a record to be made in one place and the remainder of it in another place.

It will, of course, be understood that the master clock may be located at any suitable point, near to or distant from the machines which it controls. It will, of course, also be understood that any suitable time indicating or recording machines may be used other than those specifically and diagrammatically illustrated in the drawings. Many other modifications or departures from or changes in, the form of the devices shown in the drawings may, of course, be made without departing from my invention.

I will now proceed to describe how the timing cams 50 are controlled by the master clock, and how these timing cams control the movement of the printing time type wheels 49 in the adding direction and also control the operation of the punches 46, and how the pin boxes 51—51, controlled by holes previously punched in the card, control the time type wheels 49 in their subtracting movement in order to cause them to indicate a record elapsed time. Of course, any suitable devices may be used for accomplishing these purposes. That shown in the drawings is as follows: The timing cams 50 are operated in each time recorder by electrical magnet 40. The devices shown for this purpose are especially illustrated in Figs. 3, 12, 14 and 15. Magnet 40 is secured to the side frame 66 of the frame-work of the machine by bracket 62. Its armature 60 is pivoted to the side frame at 59. A downwardly projecting piece 65 fastened to the armature carries the pin 64 which enters a slot in short lever 468 fastened to stud shaft 63. On the other end of this stud shaft 63 is fastened lever 310 (see Fig. 15) having at its outer end a pivot 311 to which is secured link 321. This link is connected at its upper end 325 to side plate 324 mounted so as to rotate freely on shaft 550 fastened to the side frames of the machine. At each impulse of the master clock link 321 is pulled downward as viewed in Fig. 15, and side plate 324 is rocked upward on shaft 550 in order to feed the timing cams and indicating wheels. On the outer end of shaft 550 is mounted a plate 552 provided at its right hand end with slot 553. Rod 232 secured to side plate 324 carries a feeding pawl 269 (see Fig. 14) for the timing cam of lowest denomination. In view 14 the cam is numbered 50 and the indicating wheel 404, the latter two being fastened together and moving as a unit loosely on shaft 550. Rod 232 has an outwardly extending end 551 working in slot 553 of plate 552. Fast on plate 552 is a short lever 554 and pivoted to its outer end is the upward end of piston rod 555 carrying a piston (not shown) working in dash-pot cylinder 556 in the usual manner. Cylinder 556 is pivoted to the framework at 57. The purpose of the piston and cylinder is to retard and cushion the stroke of the armature 60 and connecting parts. The position of the timing cams are controlled by the master clock and always represent time of day as is also the case with the indicating wheels (see Fig. 3). Each indicating wheel is fastened to its corresponding timing cam. At each impulse of magnet 40, rod 232 carrying feeding pawl 269 is raised, feeding the cam 50 through a ratchet 266 fast with the cam and into the teeth of which pawl 269 normally projects. A spring 271 secured to a tail projecting from pawl 269 and at its other end to a cross plate or strut 270 secured to frame 324 holds pawl 269 in engagement with ratchet 266. 150 is a stop bar to limit the upward movement of the pawls and their connecting parts. The timing cam of lowest denomination operates the timing cams and indicating wheels of higher operations by any suitable carrying mechanism. As these form no part of the invention they will not be shown and will not be fully described.

The particular devices shown for moving the type wheels 49 in their adding direction are operated by the turning of handle 54 of the machine and are controlled by the timing cams. The specific devices shown are illustrated in Figs. 1, 13, 14 and 15. Fig. 14 illustrates a timing cam 50 of the lowest denomination, and Fig. 15 illustrates a timing cam 50 of a different denomination. The operation of each, however, is substantially the same. 256 is a wiper loosely pivoted on stationary shaft 157, there being one for each cam, and having a roller 255 bearing upon cam 50. Wiper 256 is provided with gear teeth 471 meshing with teeth 472 on sector ratchet piece 246 loosely mounted on shaft 159. Sector ratchet piece 246 has a series of ratchet teeth 473 at its lower end. The position of sector 246 and its ratchet teeth 473 will depend upon the position of the timing cam. They constitute the actuator for operating type wheel 49 controlled by the cam. This actuator is operated by driving mechanism consisting of a frame composed of two arms 247 (one only being shown, see Fig. 14), connected by a universal bar 250, by small rod 348 and by shaft 252, and being mounted fast on shaft 159. Shaft 252 carries loosely mounted on it one pawl for each actuator. That shown in Fig. 14 is numbered 251 pivoted at 252 and having a tooth at its left hand end normally held by spring 253 in engagement with teeth 473. Shaft 159 is rocked at each rocking of main shaft 532 (see Fig. 13) by means of cam 169 engaging roller 170 on sector lever 161 loosely pivoted on shaft 172, the teeth on sector 161 engaging teeth on sector 160 fast on shaft 159. The roller 171 on sector 161 is for the purpose of positively returning the rods to their normal position on the return of shaft 532. The movement of shaft 159 rocks frame 247 carrying with it pawl 251 and the other pawls and moving them to the left as viewed in Fig. 14. This extent of movement is always the same. At the right hand end of the movement the pawls strike a bar 234 and are rocked out of engagement with the teeth 473. In all other positions the pawls are in engagement with the teeth 473. As the frame 247 sweeps to the left each pawl engages with teeth 473 of its sector and moves it to the left. In this movement the particular ratchet tooth with which the pawl engages with will depend of course upon the position of sector 246 and that will depend upon the position of the corresponding wiper and timing cam. In the position shown in Fig. 14 pawl 251 when freed from bar 234 will engage with the second tooth of ratchet 473, the position corresponding with the position of timing cam 50 representing two-tenths of a minute. At other times pawl 251 will engage with other teeth of the ratchet depending upon the time. Accordingly the extent of movement which the pawl communicates to sector 246 will depend upon the position of the timing cam and that upon the time of day. In its movement to the left sector 246 engages pin 272 on gear sector 176 loosely mounted on shaft 159. This rotates sector 176 to the left until pawl 251 comes into engagement with stop rod 224 secured in the side frames of the machine. In the movement of these parts the wiper is removed entirely out of the pawl of its timing cam so that the latter can continue its rotation unaffected. Teeth 474 on sector 176 mesh with teeth 475 on time of day rack 235. This rack is guided by two guide rods 221 and 223 projecting from the side frames of the machine through slots 505 and 506 in rack 235. These rods of course project through corresponding slots in all of the other day racks, one of which is provided for each type wheel (only one however being shown in the drawings). The slots are long enough to permit rack 235 to move up a distance of nine units and to do this in a perfectly straight line. 265 is a light tension spring to normally hold rack 235 in its position. The spring is fastened at its upper end 284 to the rack, and at its lower end to rod 177 fast in the side frames. A series of teeth 476 and the lower opposite edge of the rack engage with a pinion or differential gear wheel 238. This differential also meshes with another rack 205 used for subtracting purposes as will be presently described. Subtracting rack 205 is similarly mounted being provided with slots 507 and 508 through which pass guide rods 218 and 222. A differential gear is provided of course for each time of day rack, and a subtracting rack for each differential gear. 208 are teeth of a comb projecting between the subtracting racks to insure proper alinement. These teeth are fast to a supporting strut 207 and secured to a framework. Each type wheel 49 is provided with a differential and connecting parts as described. The corresponding parts between 50 and the type wheel 49 there shown are as follows, (see Fig. 15): wiper 320 and roller 319, sector 322 with its gear teeth, pawl 326, gear sector 328 with its pin 327, time of day rack 314 with its spring 329 secured to pin 330 on the rack, differential 309 and stationary guide rack 332. In order to hold the differentials normally at their lowest position a lever 237 encircles at one end a pin 239 passing through the axis of the differential, and at its other end is loosely mounted on rod 172 and is pulled downward by a spring 229 secured to a strut 180 fast in the framework. In Fig. 15 the corresponding parts are the lever 306, 308 and 305. In the normal position of the parts, the type wheels stand at zero, the time of day racks and their connections in their lowermost position, the subtracting racks in their heighest position and the differentials and the differential racks in their central position. Each differential rack is provided with a series of teeth 480. The rack shown in Fig. 14 is numbered 220 and that shown in Fig. 15 is numbered 283. The teeth 480 are in mesh with a pinion 244 fast to its type wheel 49, and the teeth 480 of differential rack 283 are in mesh with a similar pinion 333 fast to its type wheel 49. Accordingly, as the differential gear and its rack rise and fall, the corresponding time type wheel will be rotated one way or the other. The type of the type wheels are so arranged that when the differential rises it will tend to add on the wheel starting at zero and going upward, and as the differential gear and rack fall it will tend to move the type wheel in a reverse direction. 219 is a guide-bar for holding the differential racks in proper vertical alinement. It will be understood that as the handle of the machine is operated each type wheel will be moved in an adding direction to correspond with the position of its corresponding timing cam. Each wheel will therefore indicate the time of day bringing upon the printing line opposite printing hammer 137 type representing that time. When the printing hammers are operated that time will be printed upon the card inserted in the slot. Each timing cam is provided with a pawl 285 loosely mounted on rod 158 and engaging with one of the teeth of ratchet 266 to prevent backward rotation, and spring 274 secured to the pawl and to a rod 276 holds the pawls in engagement with a ratchet. Any suitable devices may be used for operating the punches. Those shown are especially illustrated in Figs. 3, 6-9, 13. 46 are the punches, a series of punches being provided for each division of time, ten punches, for example, for the tenths of minutes, etc. These are provided by the punch selecting devices controlled by the timing cams. Only one of the punching operating means is shown but those for the other series are provided in exactly the same manner. 144 is the punch selector for the tenths of minutes and is shown in Fig. 13. The punches 46 are steel rods mounted in two guide plates 146 and 260 and each is fitted with a collar 123. A die plate 125 is arranged at one end of the card slot. This plate is provided with holes registering with those in guide or stripper plate 260. Levers 124 return the punches to their normal position. They are operated by the punch operating mechanism presently to be described. Punch 126 is for the purpose of making the detector hole in the card and it is returned to its position by means of compression spring 127.

A punch selector is provided for each series of punches, one punch selector 144 only being shown in the drawings. The punch selectors are controlled by the timing cams. Punch selector 144 is controlled by sector 176 operating the time of day rack 235 as already described. This is accomplished by means of cross over 257 from sector 176 to sector 162. The sectors and their cross over are loosely mounted on shaft 159. Cross sections of the other cross overs 258 and 259 are shown in Fig. 14. Sector 162 is provided with teeth 483 which mesh with pinion 167 loose on shaft 182, the latter meshing with teeth 484 on the lower part of selector 144. Accordingly, the same extent of movement that is imparted to sector 176 to move the time of day rack 235 and to add on the corresponding type wheel 49 is also imparted to the corresponding punch selector rod 144. This brings the nose 485 of each punch selector rack opposite the particular punch in its series which represents the same unit of time as the then corresponding position of the timing cam. The punch selectors normally stand at their uppermost or zero position and are moved downward to the proper position representing the time of day.

148 is a comb fastened at its upper end to a rod 147. The teeth of the comb lie between the different punching selectors and act as a guide. 149 is another comb for the same purpose for guiding the selectors in their vertical movement and in keeping them in alinement with the punchers. This comb has slits 486 through which a backward projection 487 of the punch selector at its top projects and a pin 503 secured to this projection stands sidewise to prevent the forward movement of the punch selector until operated, as will presently be described. The guide plates 260 and 125 are held in place at the top by casting 121 and at the bottom by casting 129, the casting being fastened to the side frames 168.

The means for operating the punching selectors are as follows: A shaft 174 extends across the machine and is fast in both side frames 66 and 168. Loosely mounted on this shaft are two upright arms 338 (one only being shown, see Fig. 13) extending between them at their upper end, and rigidly connected to them is the punch operating plate 154 against which abut the projections 487 of the punch selectors. Operating plate 154 is moved forward and backward by the operation of handle 54 of the machine, as will be presently described, and this forces the punch selectors forward, the nose 485 of each selector strikes its appropriate punch 46 and forces it through any card that may be in the slot and forces the plate 154 forward or to the left as viewed in Fig. 13. I employ a toggle lever arrangement of which 153 is one part and 151 is the other part. Part 153 consists of two arms, each pivoted at 155 to each of the upright levers 338. Part 151 consists of two arms freely pivoted on shaft 550 and at its other end it is pivoted at 457 to the part 153. This whole arrangement constitutes a toggle frame for forcing plate 154 forward. The toggle is operated through link 143 secured to parts 151 at 152. This link has a slot 489 at its lower end in which at 140 is pivoted the upper end of lever 141 fast on shaft 142. Slightly farther up on link 143 is an L-shaped opening 488, through which extends an operating pin 139 fast to lever 138, the latter loosely pivoted on shaft 182. Lever 138 has a cam roller 163 at its other end bearing upon the face of cam 168 fast on main shaft 532. Just before the end of the forward movement of main shaft, cam 168 operates lever 138 rocking downward the left hand end of the lever, as viewed in Fig. 13. If at that time pin 139 is in the position in slot 488, shown in Fig. 13, pin 139 will simply be removed idly down in the slot and link 143 will not be pulled downward and no punching will be performed. If, however, lever 141 has been rocked to the right, as viewed in Fig. 13, by means presently to be described, the lower part of lever 143 will be rocked slightly to the right moving the L-shaped slot so that pin 139 will now occupy the left hand upper branch of the slot, and if it is in this position when lever 138 is rocked, link 143 will be pulled downward and the toggle will be operated and the punching done. Spring 156, secured to shaft 157 in the framework and to plate 154, returns the parts to their normal positions at the end of their operations. Levers 124 are operated in unison with plate 154 by means of link 164 pivoted at 165 to one of the upright levers 338. At its other end link 164 is pivoted to crank arm 166 fast to shaft 202, which shaft is mounted freely on both the side frames on the machine. The levers 124 are fast on this shaft. Thus, levers 124 move with plate 154 and positively push the punches back to their normal position at the end of the operation. At the opposite end of the shaft 202 is mounted the hour printing lever presently to be described in connection with the printing mechanism, 128 is a pan or receptacle for receiving the punchings from the dies to prevent clogging of the parts of the machine.

It will be understood from the above that on the "in" or first operation of the recording machine the type wheels will be moved to a position to agree with that of the timing cams and also the punches, and that both the type wheels and punches will in those positions represent the time of day. Upon a further operation of the handle that time will be printed and the holes representing that time will be punched in the card. At a second or "out" operation of the machine the operator inserts a card reversely and pulls forward the handle. This causes the type wheels and also the punches to be moved as before into a position in accordance with that of the timing cams, in which position they will represent the time of the second operation. In the further operation of handle 54, however, the type wheels will be moved backward a distance representing the time of the first operation, thus subtracting the latter from the time of the second operation and giving the elapsed time between the two operations. This subtracting operation is controlled by the time record previously made upon the card as represented by the holes punched at that time. These subtracting devices as shown are illustrated in Figs. 3, 14 and 15. This subtracting operation is affected through the subtracting racks and by pin boxes, one series of pin boxes representing different units of a division of time being provided for each subtracting rack. The pin boxes are mounted so they can be moved toward or away from the card so that any pin projecting through a hole in the card will project into both of its subtractor racks and control the extent of its movement. One series of pins is shown in Fig. 14 representing those corresponding to the tenths of minutes type wheels of which all of the other pin boxes are constructed and operated in substantially the same manner, except of course that the number of pins will vary according to the denomination of time. The tenths of minutes pin boxes (see Fig. 14) is mounted at the top of a movable lever 203 loosely mounted on a rod 175 fast on the side frames of the machine. This lever carries at its upper end two struts 211 and 212 which together form a frame or box to hold the pins 209. There are ten of these pins and each one is provided with a collar 261 and a compression spring 210. The normal position of the parts is that shown in Fig. 14. In Fig. 15 292 is the supporting lever for the detector mechanism pin box. 288 and 287 are the struts of this box, 290 is the detector pin (there being only one pin in this box), 289 the spring and 291 its collar. The pin boxes and their levers are adapted to be moved toward and away from the card in the slot. The mechanism for this purpose consists of piece 214 loosely mounted on rod 175 and fast with an arm 227 carrying at its other end a cam roller 228 bearing upon surface of cam 230 fast on shaft 532. Piece 214 is provided at its upper end with a rod 213 which passes through an aperture in all of the pin box supporting levers. Piece 214 and 227 are rigidly connected by a bushing 504 on rod 175. The parts are shown in their normal position in Fig. 14. It will be seen that at the first movement of shaft 532, the cam 230 will cause piece 214 to be moved to the right as viewed in Fig. 7 and through rod 213 it will move all of the pin boxes to the right against any card that may be in the card slot. In the first operation of the machine in which an unpunched card has been placed in the slot the pins will be stopped by the card and will not pass through into the path of separator racks. Accordingly, the pins will similarly press idly against the card and do no work. In a second operation where a card or cards with holes punched in it is inserted, those pins which register with the punch holes in the cards will pass through such holes and through the plate 260 and project beyond it and over the path of a subtractor rack as shown in Fig. 15. A subtractor rack is, of course, provided for each type wheel. Rack 205 is shown in Fig. 14 and hook piece 294 is shown in Fig. 15. These racks, etc., in their normally zero position are at the upper end of their stroke, as shown in Fig. 14. Each rack is provided with a set of gear teeth 481 which meshes with a corresponding differential gear. Thus rack 205 meshes with differential gear 238 etc. Each subtractor rack is provided with two vertical slots 507 and 508 and through these project guide rods 218 and 222 secured to the side frames of the machine to permit vertical movement of the subtractor racks and to guide that movement. At each operation of the machine each subtractor rack is allowed to drop any length of the slots 507 and 508 unless sooner stopped by a pin projecting through a hole in the card. In this outward movement they turn the differential gears to the left as viewed in Fig. 14 and cause those gears to roll downward on the teeth 476 of the time of day racks 235, etc. This movement is imparted through the different differential racks and pinions to the corresponding type wheels causing them to be moved in a clockwise direction as viewed in Fig. 14. In fact it subtracts from the time of day the time of the first or "in" operation. Accordingly, the type wheels will stand with type upon the printing line representing the time elapsed between the two operations. In the normal positions of the gears the differentials are of course standing at the neutral or zero position. The time of day racks move the differential gears upward and the subtracting racks move them downward. The resulting position represents the elapsed time between the two operations. This is communicated to the type wheels as already described.

226 is a spring attached to piece 214 and to strut 178 on the framework to keep roller 228 of arm 227 in contact with cam 230.

In order to permit the subtractor racks to fall at the proper time and at other times to be held in their uppermost position I provide a lever connected with each differential gear. The one shown in Fig. 14 is 237 loosely mounted on shaft 172. It is pivoted on rivet 239 to differential 238, the slot 240 being of such size as to permit free movement of the parts. In Fig. 9 the same parts for the hour wheel are shown as lever 306 secured to rivet 308 of the hour differential having slot 307. A similar arrangement is also provided for each of the other differential gears. The rods 264 secured to the lever 262 holds all of these levers normally in their home position. A spring 229 is secured to lever 237 and a corresponding spring 305, some of the springs being secured at one end to rod 180. As soon as the machine starts, cam 231 allows roller 263 on the other arm of lever 262, loosely pivoted on shaft 172, to move inwardly toward shaft 532. This permits bell crank 262 to turn on its pivot and allows the universal bar 264 to move downward, and therefore allows tension springs 229, 305, etc., to pull the differential gears and their racks downward. The other end of bar 264 is attached to lever 342 loosely pivoted on shaft 172. Thus while the addition is taking place upon the type wheels, rod 264 is being lowered and the gears are free to move downward under the weight of the subtractor racks and the springs.

When the differential gears drop below zero it is necessary to borrow from the type wheel of the next higher order. Any suitable borrowing device may be used. As these form no part of the present invention they are not shown in detail and will not be further described, except to say that the pin box supports are arranged so that after they have been moved into position they can be dropped back slightly when borrowing is required in order to permit the pin 209 to engage with the outer one of the two steps 206 of the subtractor rack. This permits the subtractor rack to fall one additional point and borrowing one from the next higher wheel. To permit this slight backward motion the slot 294 is made slightly larger than shaft 213, and spring 225 for each support tending to pull the support backward whenever a catch 268 is disengaged from the nose on the block 243 of the support. Normally the catch 268 is in locking engagement holding the supports at the forward or right hand position as viewed in Fig. 14. The spring 242 for each catch holds it in catching engagement against a stop rod 216. The catch levers 268 are loosely mounted on a cross-rod 217 and at their lower end are tripped by a pin 273 on the differential gear striking a projection 241 on the right hand lower end of the lever 268, when the differential passes below the zero point. As the pin boxes go forward on the same movement the catch lever 268 is pivoted to move into operative or catching position. The means for this consist of a link 302 (Fig. 15) pivoted at 304 to arm 342 and at its other end pivoted at 303 to plate 331 which is freely pivoted on rod 217. A similar plate (not shown) is freely pivoted on the other end of shaft 217 and a universal rod 216 passes from one plate to the other. The catch levers rise against this rod 216, and are lifted out of engagement or let into engagement at the proper time. When the universal bar 264 drops down it pulls rod 216 downward permitting the catches 268 to engage with the catches 243 on the pin box supports. They are now in position for the borrowing operation when it becomes necessary. Toward the close of the operation of the machine when rod 264 is moved back to its normal position, rod 216 also moves to the left as shown in Fig. 15 and raises the lever catches 268 out of engagement, permitting the pin boxes to move back into their original position.

The detector pin 290 is used to detect whether a card has been previously introduced into the machine or not and for the purpose of operating cut-out mechanism to cut out of operation the punching mechanism if the card has been previously introduced.

126 is a detector punch mounted in guide plates 260 and 146 like the other punches and provided with a compression spring 127 and a collar 123. It is operated by means of a punch operating stud 145 fast to plate 154. When a card is first introduced punch detector 126 punches a detector hole in the card. When the card is introduced for the second time with a detector hole punched in it as shown in Fig. 15 the detector pin enters the detector hole 428. This provides a cut out mechanism as follows: A link 294 resembling the subtractor racks is provided at its upper end with the extension 495. When this link 294 drops, it encounters a detector pin 290 if the latter projects through a hole in the card and link 294 is arrested in its downward movement. Link 294 is pivoted at its lower end to bell-crank lever 296 at 295. This bell crank is fast on shaft 142 and is pivoted at its other end to link 298 at 297, the latter being attached by screw 299 to link 302. This screw works in a slot 510 and link 298 is kept at one end of the slot by tension spring 300 secured at 301 to link 302. As link 294 is arrested in its downward movement by the detector pin, spring 300 is slightly stretched by the continued movement of 302 to the right as already described. As bell-crank 296 and lever 141 are both fast on shaft 142 lever 141 is prevented from being rotated downward and to the right as viewed in Fig. 13 as it would be rotated if the movement of shaft 142 were not thus arrested. Accordingly, pin 139 will remain in the right hand or vertical portion of the L-shaped slot 488 in link 143 and the punching mechanism will remain inoperative. If no detector pin is inserted into the path of shoulder 495 of link 294 the rotation of lever 141 to the right will continue and the punching operation will be performed. This latter takes place when an unpunched card is introduced into the slot. Detector pin 290 is provided with a collar 291 and a compression spring 289 and is mounted on a supporting lever 292 loosely mounted on the shaft 175 but having an opening 294 through which rod 213 passes as in the case of the other pin box supports.

Any suitable printing mechanism may be employed. That shown consists of two pressure printing pads 137 and 138, pad 137 printing the minutes and tens of minutes and pad 213 printing the hours when such printing is required. Referring to the printing pad 137 for printing minutes, 132 (see Fig. 13) is a lever which has meshing with it the round ends 134 of the projecting end of operating lever 138 already described. As lever 138 operates every time the machine is operated for minutes are printed at every time. Printing pad 137 is adjusted relatively to lever 132 by means of an eccentric 135 fast on the arm of the printing pad revolved by screw 136. This eccentric is for the purpose of adjustment. Lever 132 is loosely mounted on shaft 133. The hour printing pad 318 (Fig. 15) is operated by lever 315 and is fast on shaft 202. This shaft is operated, as already described, only when the punching operation is taking place; the hours are printed only at such operation, or in other words, the hour is shown only on the ringing-in operation of the machine. The rounded head of lever 315 meshes with a rounded cup 316 loose on shaft 155. Lever 316 is connected to lever casting 293 carrying the hour printing pad 318. The two parts are adjusted by means of screw 317 meshing with a worm (not shown) on the casting 293. Any suitable mechanism may be employed. As these form no part of my invention they will not be shown in detail and will not be described.

In order to guide the pin boxes in their movement toward and away from the card slot, I preferably provide grooves 498 (one of which is shown in Fig. 15), in a flat plate 67 which is fastened to the side plates 66 and 168 and place upon the top of each of the pin box struts 51, etc., a pin 286, the pins moving in the slots.

What I claim as new and desire to secure by Letters Patent is:

1. The combination of a plurality of elapsed time recording devices, separate operating means for actuating the recording mechanism of each device, controlling means in each device for controlling the extent of operation of its operating mechanism, and a master clock adapted to control the controlling mechanism of each device so as to cause them to operate in synchronism with each other.

2. The combination of a plurality of elapsed time recording machines, a recording mechanism in each machine for making an initial record upon a card or other suitable record surface, recording mechanism in each machine for making a final record upon such card, means adapted to be actuated by an initial record made upon a card to control the extent of movement of the recording mechanism for making the final record, a master clock, and means in each machine for also coöperating with the control of the movement of the recording mechanism for making the final record, adapted to be controlled by the master clock to cause them to control the final time recording means in the different machines in synchronism with each other.

3. The combination of a time recording device adapted to make a mark upon a card, a card, another time recording device adapted to receive and be controlled in its time recording operation by such a mark on the card, and a master clock adapted to control such time recording devices to cause them to operate in synchronism with each other.

4. The combination of a time recording device adapted to make a preliminary mark upon a card, a card, another time recording device adapted to receive and be controlled in its time recording operation by such a preliminary mark on the card to cause it to complete the time record, and a master clock adapted to control such time recording devices to cause them to operate in synchronism with each other.

5. The combination of a plurality of elapsed time recording devices adapted to coöperate with each other in making elapsed time records, and a master clock adapted to control such elapsed time recording devices to cause them to operate in synchronism with each other, whereby the time recording devices may be used interchangeably for making elapsed time records.

6. The combination of a plurality of elapsed time recording devices adapted to coöperate with each other to make a complete elapsed time record, each recording device adapted to make a part of the record, and a master clock adapted to control such recording devices to cause them to operate in synchronism with each other, whereby an elapsed time record may be begun upon one of said recording devices and be continued or concluded on another one of such recording devices and such recording devices be caused to operate in synchronism with each other.

7. The combination of a time recording machine adapted to make identification marks on a card representing the time of an operation of such machine, a second time recording machine adapted to be controlled in its time recording operation by such marks on the card to make a record upon such card of the elapsed time between the operation of the first machine and the operation of the second machine, and a master clock adapted to control both of such machines to cause them to operate in synchronism with each other, whereby the two machines may be caused to coöperate with each other to make a record of time upon said card representing the time that has elapsed between the operation of the first and second machines.

8. The combination of a time recording machine adapted to make identification holes upon a card representing the time of an operation of such machine, a second time recording machine, provided with identifying devices, adapted to be actuated in the recording operation of the machine by such identification holes in the card to make upon the card a record of the time elapsing between the operation of the first machine and the operation of the second machine, and a master clock adapted to control the time recording devices of such machines to cause them to operate in synchronism with each other.

9. The combination of a time recording machine adapted to make a preliminary record representing the time of its operation, a second recording machine adapted to make a final record of time and to be controlled in the making of such final record by the said preliminary record, and means for controlling the time recording mechanism of such machines to cause them to run in synchronism with each other.

10. The combination of a plurality of time recording machines, means in such machines for making a preliminary time record, means in such machines, controlled by such a preliminary time record, for making a final time record, and a master clock adapted to control such recording machines in synchronism with each other.

11. The combination of a plurality of elapsed time recording machines, each machine having means, for making a preliminary time record, and means, controlled by such preliminary time records for making an elapsed time record, and a master clock for controlling the recording devices of such machines in synchronism with each other.

In testimony whereof, I have signed my name to this specification, in the presence of two subscribing witnesses.

JAMES W. BRYCE.

Witnesses:
 EDWIN SEGER,
 GEO. M. HARRIS.

---

Copies of this patent may be obtained for five cents each, by addressing the "Commissioner of Patents, Washington, D. C."